United States Patent [19]

Kato et al.

[11] 4,271,799

[45] Jun. 9, 1981

[54] KNOCKING CONTROL DEVICE

[75] Inventors: Takayuki Kato, Aichi; Kazumasa Sumi; Hideo Arakawa, both of Nagoya; Toshimitsu Ito, Toyota; Masakatsu Sanada, Susono, all of Japan

[73] Assignees: K.K. Toyota Chuo Kenkyusho, Nagoya; Toyota Jidosha Kogyo Kabushiki Kaisha, Toyota, both of Japan

[21] Appl. No.: 34,736

[22] Filed: Apr. 30, 1979

[30] Foreign Application Priority Data

Apr. 28, 1978 [JP] Japan ................... 53-51818

[51] Int. Cl.³ .............................. F02D 5/04
[52] U.S. Cl. ..................... 123/425; 123/414
[58] Field of Search ........ 123/117 R, 148 E, 146.5 A, 123/139 AW, 140 MC, 119 A, 119 ED, 32 EA; 73/35

[56] References Cited

U.S. PATENT DOCUMENTS

| | | | |
|---|---|---|---|
| 2,450,882 | 10/1948 | Costa | 123/119 ED |
| 2,595,524 | 5/1952 | Henneman et al. | 123/119 ED |
| 2,958,317 | 11/1960 | McNally | 123/119 ED |
| 4,054,111 | 10/1977 | Sand | 123/117 R |
| 4,061,116 | 12/1977 | Saida et al. | 123/117 D |
| 4,092,955 | 6/1978 | Reddy | 123/32 EA |
| 4,116,175 | 9/1978 | Sand | 123/119 ED |
| 4,131,097 | 12/1978 | Samada et al. | 123/117 R |
| 4,153,019 | 5/1979 | Laubenstein et al. | 123/117 D |
| 4,153,020 | 5/1979 | King et al. | 123/148 E |

Primary Examiner—Charles J. Myhre
Assistant Examiner—R. A. Nelli
Attorney, Agent, or Firm—Oblon, Fisher, Spivak, McClelland & Maier

[57] ABSTRACT

A knocking control device having a knocking detecting circuit for detecting, as an electrical signal, an amount of variation corresponding to an internal pressure variation within a cylinder of an engine due to an engine knocking; an averaging circuit for converting the electrical signal from the knocking detecting circuit to a signal corresponding to a knocking energy; a crank angle detecting circuit for detecting a rotation phase of the engine; a comparison circuit for comparing the output signal corresponding to the knocking energy of the averaging circuit with a reference value defining a knocking allowable level to obtain a control signal for maintaining an engine knocking strength in a predetermined range; and an ignition control circuit connected to an ignition circuit, for controlling the ignition timing of the ignition circuit by the control signal from the comparison circuit. The present invention can detect the knocking strength with high accuracy as an electrical signal based on the cylinder internal pressure variation due to knocking and can carry out a knocking strength control suitable for characteristics of an engine by using the electrical signal. Also the present invention can remarkably improve an engine combustion efficiency and fuel consumption percentage by accepting a knocking to some extent.

32 Claims, 5 Drawing Figures

KNOCKING CONTROL DEVICE

BACKGROUND OF THE INVENTION

1. Field of the Invention

This invention relates to engine knocking control devices, and more particularly to a knocking control device which is improved so that it can control a knocking strength automatically to a predetermined value.

2. Description of the Prior Art

A so-called "knocking phenomenon" in which abnormal hammering sounds are caused in the engine of a vehicle while it is running is well known. The knocking phenomenon occurs in the case where the load is over a predetermined value and the ignition timing is excessively advanced. This knocking is undesirable because it cause unpleasant noise, and strong knocking provides strong gaseous vibration in the cylinder and causes abnormally high temperature locally in the cylinder, which may damage the engine.

FIG. 1 indicates variations in cylinder internal pressure with respect to engine crank angles. As is clear from FIG. 1, the pressure vibration is caused by the knocking when the crank angle is in the range of from 10° after the top dead center (TDC) to 30° after the top dead center. FIG. 2 is an enlarged view indicating the pressure vibration due to the knocking shown in FIG. 1. As is apparent from FIG. 2, this vibration component due to the knocking includes a damping oscillation signal having frequencies higher than several kiloHertz.

As is obvious from FIGS. 1 and 2, during the generation of knocking, the knocking vibration is superposed on the ordinary cylinder internal pressure, and therefore gaseous vibration and standing waves are generated in the cylinder as a result of which unpleasant knocking sounds are caused, and at worst, high temperature is created locally in the cylinder which may damage the engine. However, the knocking phenomenon itself produces no bad influence on the engine. Even in the case where knocking is caused by advancing the ignition timing, the fuel consumption percentage of the vehicle can be improved by increasing the combustion efficiency of the engine. In view of the improvement of fuel consumption percentage, the acceptance of appropriate knocking is suitable to provide the most effective running condition of the engine.

Accordingly, in order to obtain the most suitable engine operating efficiency and to maintain the knocking noise level lower than a predetermined value, it is necessary to control the knocking strength according to various conditions.

Furthermore, the provision of a device capable of freely controlling the strength of knocking has been desired by the manufacturers in order to obtain data concerning the design of anti-knocking engines by strictly investigating the knocking phenomenon and to approach the best octane number of fuel.

Heretofore, the knocking phenomenon has been detected by the hearing sense of a vehicle operator or mechanic and accordingly the detection is very low in accuracy and unstable. As is clear from FIGS. 1 and 2, the cylinder internal pressure should be utilized for detecting the knocking strength. Nevertheless, a method of detecting the knocking strength based on the hearing sense has been employed. It should be noted that this method detects the noise which is caused as a result of the cylinder internal pressure variation. The noise reaches the ear through the cylinder block, the cylinder head or the like. Accordingly, the noise is damped or changed in quality, and is therefore considerably different from the actual cylinder internal pressure variation. Thus, the conventional knocking strength measuring method cannot detect the knocking strength with high accuracy. Accordingly, it has been impossible to perform ignition control with high accuracy to maintain the knocking strength in a desired allowable range which is determined from engine efficiency and noise.

At the manufacturer, a full acceleration test of the vehicle is carried out to evaluate the vehicle or fuel anti-knocking characteristic. In general, data is obtained for engine design by measuring the vehicle running octane numbers or fuel octane numbers according to a corrective border line method.

The test is carried out by the sensory judgement of the knocking phenomenon utilizing the hearing sense of a person and by the manual ignition timing control, and therefore the test is disadvantageous in that the experimental data lack reproducibility. In order to eliminate this difficulty, or to maintain the knocking strength precisely in the desired allowable range, the provision of a device capable of freely controlling the knocking strength with high accuracy has been desired.

SUMMARY OF THE INVENTION

Accordingly, a primary object of the present invention is to provide an improved knocking control device which can automatically control the knocking strength to a predetermined value.

An additional object of the present invention is to provide an improved knocking control device which can detect the knocking strength with high accuracy without using sensory judgement and carry out a knocking strength control suitable for characteristics of an engine.

Another object of the present invention is to provide an improved knocking control device which can obtain anti-knocking engine design data and information concerning vehicle running octane numbers and fuel octane numbers.

A further object of the present invention is to provide an improved knocking control device which can add various characteristics according to the sensory characteristics of a person thereto.

Another object of the present invention is to provide an improved knocking control device which can carry out ignition timing control most effectively without causing unpleasant noise.

A further object of the present invention is to provide an improved knocking control device which has a more simple construction and which can be readily installed on a vehicle.

Another object of the present invention is to provide an improved knocking control device which can markedly improve the combustion efficiency and fuel consumption of an engine and automatically control an engine knocking strength to predetermined value at which the operator does not feel the knocking.

A still further object of the present invention is to provide an improved knocking control device which can detect an engine knocking strength signal in correspondence to the sensory judgement of a person.

A further object of the present invention is to provide an improved knocking control device which can perform a detection operation more suitable for actual knocking conditions by employing a signal obtained by subtracting a predetermined noise reference signal defined by the noise level of an engine itself from a detected knocking signal as a knocking detection signal.

Another specific object of the present invention is to provide an improved knocking control device which can collectively determine a knocking strength by taking into consideration not only individual knocking strengths but also the number of times of knocking in a unitary time.

Yet another object of the present invention is to provide an improved engine knocking control device which converts a detected knocking signal into logarithmic data for control operation.

Still another object of the present invention is to provide an improved knocking control device which can most suitably effect knocking control at all times by varying a reference value changing proportionally to the number of revolutions of an engine according to the logarithmic function.

A further object of the present invention is to provide an improved knocking control device which can control ignition timing of an engine by changing a predetermined constant angle in each predetermined time period.

In order to achieve the foregoing objects, this invention provides a knocking control device which comprises: a knocking detecting circuit for detecting as an electrical signal an amount of variation corresponding to a cylinder internal pressure variation due to engine knocking; an averaging circuit for converting a detection signal outputted by the knocking detecting circuit into signal data corresponding to knocking energy; a crank angle detecting circuit for detecting a rotation phase of the engine; a comparison circuit for comparing the output of the averaging circuit with a reference value defining a knocking allowable level to obtain a control signal for maintaining an engine knocking strength in a desired range; and an ignition control circuit for controlling the ignition timing of an ignition circuit with the aid of the output of the comparison circuit.

According to the present invention, a cylinder internal pressure variation due to knocking is detected as a pressure change itself or an amount of variation based on the pressure change, a detection value corresponding to the engine knocking energy is outputted with high accuracy by obtaining the average value of the detected electrical signal, and the engine ignition timing can be most suitably controlled by the output signal.

Furthermore, according to the present invention, the knocking is accepted to some extent, whereby the engine combustion efficiency and fuel consumption percentage can be remarkably improved, and the knocking strength can be maintained lower than a predetermined reference value, and also the knocking strength can be suppressed according to a variable reference value suitable for the sensory characteristic of a person by taking into account the engine speed and other various conditions. As a result, it is possible to obtain anti-knocking engine design data, and information concerning vehicle running octane numbers and fuel octane numbers.

The knocking strength signal according to the present invention is detected as a signal corresponding to the knocking energy, and therefore the output of the detection circuit is averaged. In this connection, the averaging operation according to the present invention can be carried out not only by simple average values but also by the positive or negative continuous time average value of the envelope of the variations of knocking which oscillates in a damping mode, i.e., the data corresponding to the engine knocking energy, or a value obtained by adding and cumulating the amplitude values of variation data at predetermined time intervals, the maximum amplitude values thereof or the continuous time average values of the envelope of the variation of the knocking.

Especially, according to the present invention, in the installation of the device on a actual vehicle, various characteristics according to the sensory characteristics of a person can be added thereto. As a result of the consideration of such characteristics, the ignition timing control can be carried out most effectively without causing unpleasant noise.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 3:
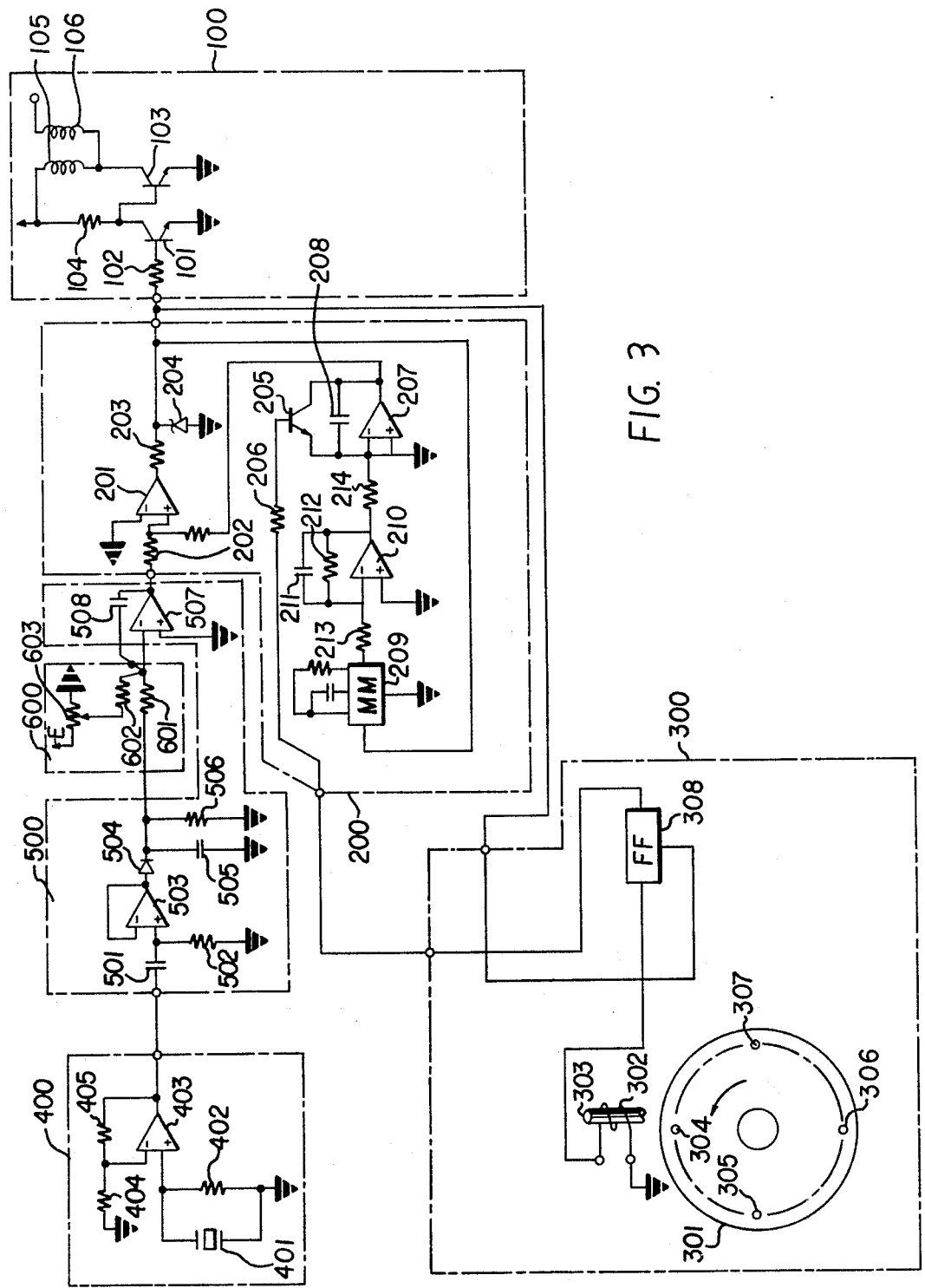
FIG. 3 is a circuit diagram showing a first preferred embodiment of a knocking control device according to this invention.

Referring now to the drawings, wherein like reference numerals designate identical or corresponding parts throughout the several views, and more particularly to FIG. 3 thereof, FIG. 3 is a circuit diagram of a first preferred embodiment of an engine knocking control device according to the present invention. In this first embodiment, a knocking strength is detected as an electrical signal corresponding to a cylinder internal pressure, the average value of a knocking signal is obtained by converting the knocking strength signal into the envelope signal of a vibration amplitude thereof, and the average value is compared with a reference value and is supplied to an ignition control circuit. With the first embodiment, it is possible to control the engine knocking strength to be less than a predetermined value at all times.

Referring to FIG. 3, the ignition timing of an ignition circuit 100 adapted to supply an ignition signal to an ignition plug is controlled by an ignition control circuit 200. A crank angle signal from a crank angle detecting circuit 300 and a knocking signal from a knocking detecting circuit 400 are applied to the ignition control circuit 200. With the aid of the two signals, the knocking strength is controlled to be in a predetermined range, and the ignition timing is so selected that the engine efficiency is best.

The knocking detection circuit 400 comprises a piezoelectric pickup 401 interposed between the ignition plug and an engine head, so that an amount of change corresponding to a cylinder internal pressure is detected from mechanical vibration applied to the pickup 401. The pickup 401 together with a resistor 402 is connected to the non-inverting terminal of an operational amplifier 403. The operational amplifier 403 and resistors 404 and 405 form an amplifier circuit in which the detected signal from the pickup 401 is amplified and is then supplied to the input terminal of an averaging circuit 500.

Figure 2:
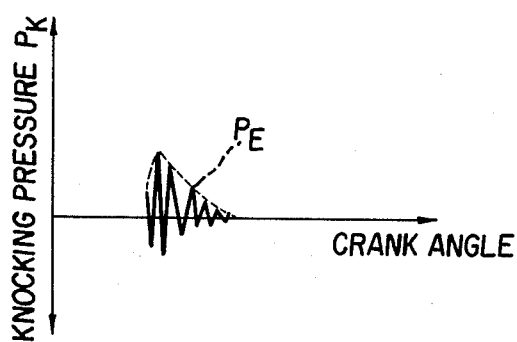
FIG. 2 is an enlarged characteristic diagram indicating only a knocking frequency component in the characteristic diagram in FIG. 1.

The averaging circuit 500 operates to take only the knocking signal having a frequency higher than 5-6 KHz out of the cylinder internal pressure variation signal from the knocking detecting circuit 400 by means of a high-pass filter consisting of a capacitor 501 and a resistor 502. The knocking signal passed through an operational amplifier 503 is subjected to rectification and smoothing operation by means of a diode 504, a capacitor 505 and a resistor 506, as a result of which it is converted into an envelope signal indicated by the broken line in FIG. 2. The envelope knocking signal is applied to a comparison circuit 600 where it is compared with a knocking reference value.

The comparison circuit 600 comprises a resistor 601 connected to said resistor 506, a reference knocking voltage source ($-E$), a variable resistor 603 connected to said reference voltage source and a resistor 602 connected to a control terminal of said variable resistor 603 and subtracts the reference knocking voltage from the envelope knocking signal. An integration amplifier of the averaging circuit 500 comprises an operational amplifier 507 and a capacitor 508, and time-averages the difference signal between the envelope knocking signal and the reference knocking voltage. In this operational amplifier 507, the knocking signal is compared with the reference knocking voltage ($-E$), and an output signal subjected to integration is provided. The output from the operational amplifier 507 is applied through a resistor 202 to an operational amplifier 201 in the ignition control circuit 200, so as to be compared with a crank angle signal described later. The output of the operational amplifier 201 is applied through a resistor 203 to the ignition circuit 100. A diode 204 is connected between the resistor 203 and ground.

The control signal from the ignition control circuit 200 is supplied through a resistor 102 to the base of a transistor 101 in the ignition circuit 100. When the output of the operational amplifier 201 is raised to a logic level "1" (hereinafter referred to merely as "1" when applicable), the transistor 101 in the ignition circuit 100 is rendered conductive. The emitter of the transistor 101 is grounded, and the collector thereof is connected to the base of a transistor 103 and to a resistor 104. The emitter of the transistor 103 is grounded, and the collector thereof is connected to an ignition primary coil 105 and an ignition secondary coil 106. Thus, when the transistor 101 is rendered conductive, the transistor 103 is rendered nonconductive, whereby an ignition signal is supplied to the ignition plug.

The above-described knocking signal and crank angle signal are supplied to the operational amplifier 201 in the ignition control circuit 200. Thus, it can be understood that the timing of inverting the state of the operational amplifier 201 according to the crank angle is controlled by the magnitude of the knocking signal. The crank angle signal is detected by the crank angle detecting circuit 300. The crank angle detecting circuit 300 comprises a detection disk 301 which is directly or indirectly fixed to the engine crank shaft, and a magnet 303 on which a pickup coil 302 is wound. In the vicinity of the circumferential side of the detection disk 301, a magnetic substance 304 is stationarily provided at a position corresponding to the top dead center of a cylinder optionally selected. Similarly, magnetic substances 305, 306 and 307 are stationarily provided at a position corresponding to 90 degrees before the top dead center, at a position corresponding to the bottom dead center, and at a position corresponding to 90 degrees after the top dead center, respectively. Thus, the crank angle detection signals are provided by the pickup coil 302 at the position of the top dead center, at the position 90 degrees after the top dead center, at the position of the bottom dead center, and at the position 90 degrees before the top dead center, respectively, and are applied to a flip-flop 308 of the crank angle detecting circuit 300. The ignition control signal outputted from the ignition control circuit 200 is applied to the reset terminal of the flip-flop 308. The flip-flop 308 is reset by the leading edge of the ignition control signal. Thus, the flip-flop 308 is maintained reset until the top dead center position and the bottom dead center position of the cylinder pass through the pickup 302. Accordingly, the output of the flip-flop is set to "1" when the crank angle corresponds to the top dead center position 304 and the bottom dead center position 306, and to a logic level "0" (hereinafter referred to merely as "0" when applicable) when the crank angle corresponds to the position 90 degrees after the top dead center 307 and the position 90 degrees before the top dead center 305. The flip-flop 308 of the crank angle detecting circuit 300, as was described before, supplies the "0" signal to a transistor 205 through a base 206 of the ignition control circuit 200 at 90 degrees before the top dead center. The transistor 205 is employed as a reset switch of an integrating circuit comprising an operational amplifier 207 and a capacitor 208. Applied to an input side of the integrating circuit is an integration signal corresponding to the output of the operational amplifier 201 forming a comparator. That is, the output signal of the operational amplifier 201 is supplied to monostable multivibrator circuit 209 whereby a pulse having a predetermined pulse width is obtained from the monostable multivibrator 209 every ignition timing. This pulse is smoothed by a smoothing circuit comprising an operational amplifier 210, a capacitor 211 and resistors 212 and 213, whereby it is supplied, as a DC voltage proportional to an ignition interval, to the operational amplifier 207 in the integration circuit through a resistor 214. Accordingly, the integration being started at 90 degrees before the top dead center, a sawtooth waveform, which rises in a ramp state and is reset at the ignition timing, is provided at the output of the operational amplifier 207. As the integration input of the integration circuit is obtained from the ignition control signal as was described before, the amplitude of the sawtooth waveform has a signal value corresponding to the ignition timing, i.e., the engine speed, and the output voltage at an optional crank angle is constant and independent of the engine speed. Accordingly, in the case that the knocking signal is lower than the reference value, the operational amplifier 201 carries out the ignition control at a constant crank angle position at all times using this ignition control signal. In the case where the knocking strength has increased to exceed the predetermined reference value, the knocking strength signal output which is supplied from the comparison circuit 600 to the ignition control circuit 200 is increased according to the extent of increment of the knocking strength, as a result of which the ignition timing is delayed until the ramp output from the operational amplifier 207 exceeds the knocking strength signal thus increased. Thus, delaying the ignition timing has been accomplished.

As is apparent from the above description, in this first embodiment, the cylinder internal pressure variation caused by the occurrence of knocking is detected, as mechanical vibration, by the pickup 401, the envelope output corresponding to the knocking signal is obtained from the vibration signal thus detected, and the knocking signal is averaged. The knocking signal thus averaged is compared with the reference value. When the knocking signal exceeds the reference value, the ignition timing is controlled according to the knocking strength.

The first embodiment described above is most suitable for maintaining the knocking strength less than the predetermined value in inspecting engine characteristics.

Figure 4:
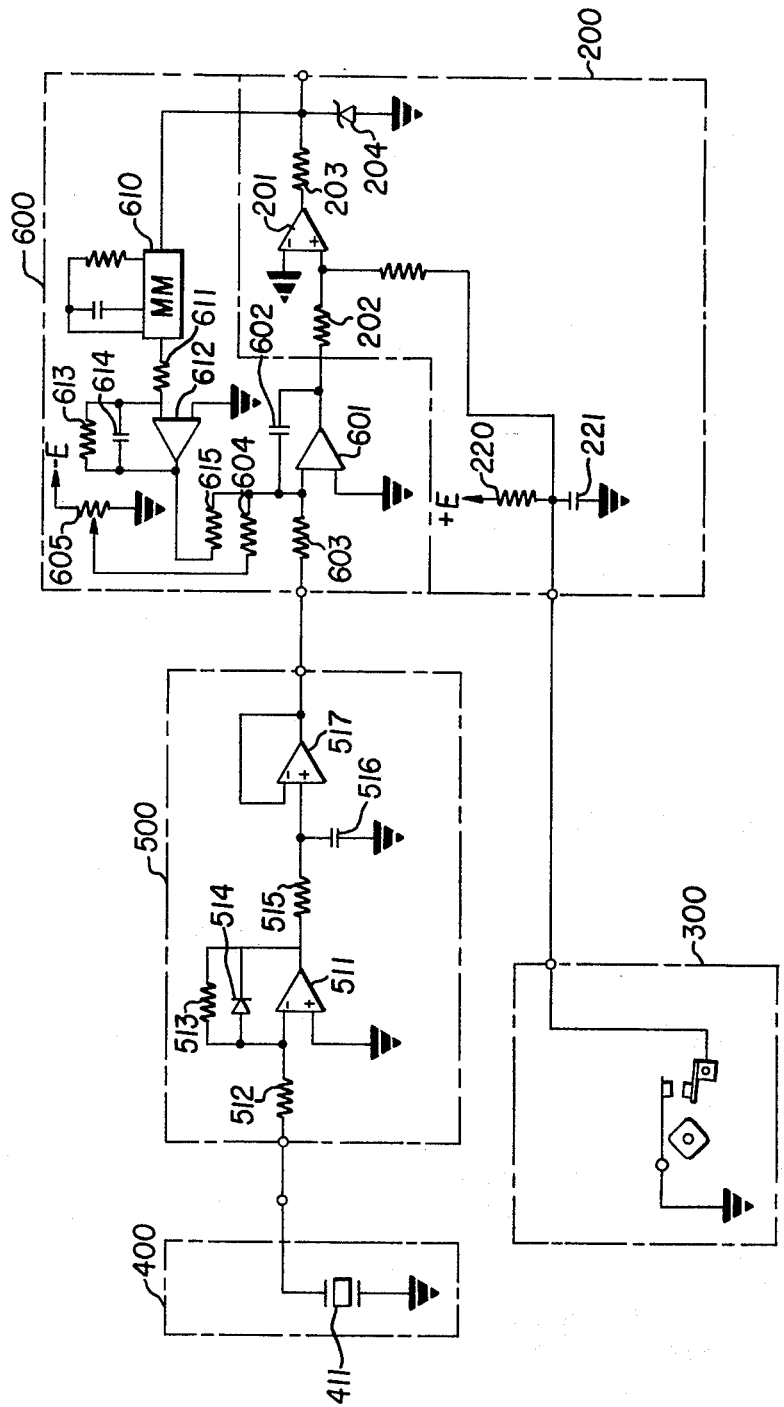
FIG. 4 is a circuit diagram showing a second preferred embodiment of the knocking control device according to the invention.

FIG. 4 illustrates a second preferred embodiment of the locking control device according to the present invention. The second embodiment is so improved that the circuitry is much simpler than that in the first example, the device can be readily installed on a vehicle, the combustion efficiency and fuel consumption of an engine are markedly improved, and the engine knocking strength is automatically controlled to a predetermined value at which the operator cannot feel knocking. In this second embodiment, the cylinder internal pressure variation due to the occurrence of knocking is detected as the vibration acceleration of an engine itself, and the knocking detecting signal is rectified and smoothed to obtain an envelope signal, which is averaged. This is one of the specific features of the second embodiment. Furthermore, the knocking strength signal is compared with a reference value, thereby to control the ignition angle advancement of the engine.

According to the second embodiment, a crank angle signal for ignition control is obtained from a contact point, and a desired crank angle signal is obtained from the detection signal from the contact point and a CR integration circuit. The noise of an engine itself is increased with the speed (number of revolutions) of the engine, and therefore a part of the noise due to the knocking is cancelled by the engine noise. Based on this fact, the knocking strength allowable value is increased when the engine runs at high speed, thereby to improve the engine efficiency. This is another specific feature of the second embodiment.

A knocking detecting circuit 400 includes a piezoelectric acceleration pickup 411 equipped to a cylinder block of the engine, so that an amount of variation corresponding to a cylinder internal pressure is obtained as an electrical signal by detecting the vibration acceleration of the engine body. The pickup 411 is connected through a resistor 512 to an operational amplifier 511 in an averaging circuit 500. A resistor 513 and a diode 514 are connected between the input and output terminals of the operational amplifier 511, to form a half-wave rectification amplifier. In general, the pickup 411 can be represented by a series circuit comprising a capacitor and a signal source. The equivalent circuit of the pickup 411 and the resistor 512 form a high-pass filter. Accordingly, it is possible to select only a knocking signal having a desired frequency component by setting the resistance of the resistor 512 to a predetermined value. The average value of the knocking signal output of the operational amplifier 511 is obtained by a smoothing circuit comprising a resistor 515 and a capacitor 516. The knocking signal output from the operational amplifier 511 is amplified by an operational amplifier 517, and is outputted, as an averaged knocking signal, by the averaging circuit 500.

Similarly as in the first embodiment described with reference to FIG. 3, the output of the averaging circuit 500 is applied to an operational amplifier 601 in a comparison circuit 600, where it is compared with a knocking reference value supplied through a variable resistor 605. Furthermore, similarly as in the first embodiment, the output of the comparison circuit 600 together with a crank angle signal are applied to an operational amplifier 201 in an ignition control circuit 200. The output of the operational amplifier 201 is supplied to an ignition circuit (not shown) to control the extent of ignition angle advancement.

The output of the operational amplifier 201 is further applied to a monostable multivibrator 610 provided in the comparison circuit 600, whereby an output pulse having a predetermined pulse width is applied through a resistor 611 to an operational amplifier 612 at every production of an ignition signal. A resistor 613 and a capacitor 614 are connected between the input and output terminals of the operational amplifier 612, to form an integration circuit, so that a DC voltage proportional to an ignition interval, i.e., an engine speed is provided at the output of the operational amplifier 612. The DC voltage proportional to the engine speed together with a reference voltage supplied from a variable resistor 605 through a resistor 615 is applied to the operational amplifier 601, so that in the case where the noise of the engine itself is increased with the speed of the engine, the knocking allowable reference value is increased to permit the production of knocking having a knocking strength greater than that in the ordinary condition. Thus, it is possible to improve the engine efficiency at the high speed operation of the engine.

The ignition control circuit 200 in the second embodiment includes a ramp voltage generating circuit comprising a resistor 220 and a capacitor 221 which are connected through a resistor 215 to the non-inverting input terminal of the operational amplifier 201. The connection point of the resistor 220 and the capacitor 221 is connected to the contact point in a crank angle detecting circuit 300. Whenever the contact point is closed, the capacitor 221 is discharged through the contact point thus closed. The capacitor 221 is charged through the resistor 220 at the ignition timing, that is, when the contact point is opened. Accordingly, a crank angle signal defined by the charging characteristic of the capacitor 211 is supplied to the operational amplifier 201.

Figure 1:
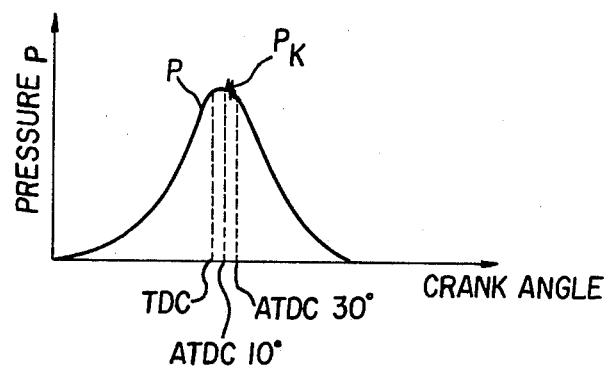
FIG. 1 is a characteristic diagram indicating variations in cylinder internal pressure due to the occurrence of knocking with respect to crank angles.

In the embodiment illustrated in FIG. 4, the contact point of the crank angle detecting circuit 300 is set to make more angle advancement as much as about 20 to 30 degrees in crank angle than that in an ordinary engine so that its opening and closing timing causes knocking at all times. That is, in the state thus set, the contact point is opened at around 30 to 40 degrees during the idling operation, and at around 50 to 60 degrees during the high speed operation by a well known mechanical angle advancement mechanism. By this opening operation, the voltage at the connection point between the resistor 220 and the capacitor 221 is increased in the ramp state as was described before, and this ramp voltage is compared with the knocking output from the comparison circuit 600 in the operational amplifier 201. When the crank angle signal obtained from the capacitor 21 becomes greater than the knocking strength signal supplied from the operational amplifier 601, the operational amplifier 201 output a "1" signal as was described with a reference to FIG. 1, thus providing the ignition control signal. Accordingly, when the knocking strength is increased so that the knocking signal from the comparison circuit 600 is increased, the ignition timing is delayed. As a result, the knocking is maintained at a constant level. Thus, the second embodiment has the merits that the combustion efficiency and fuel consumption percentage of the engine are improved, the engine is never damaged, and no unpleasant knocking sound which may be heard by the operator is caused.

Figure 5A:
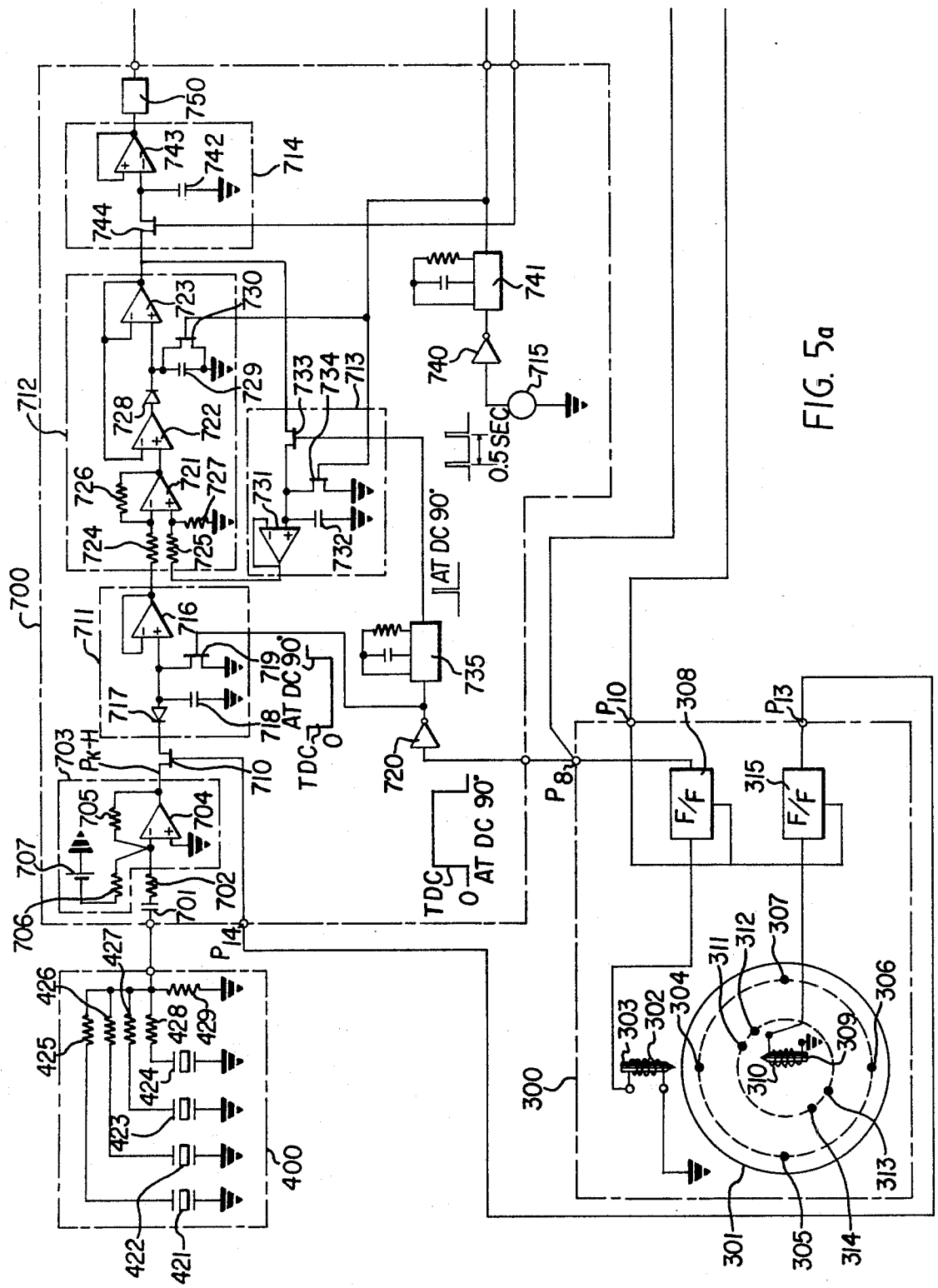
FIGS. 5A, and 5B collectively constitute a circuit diagram showing a third preferred embodiment of the knocking control device according to the invention.
Figure 5B:
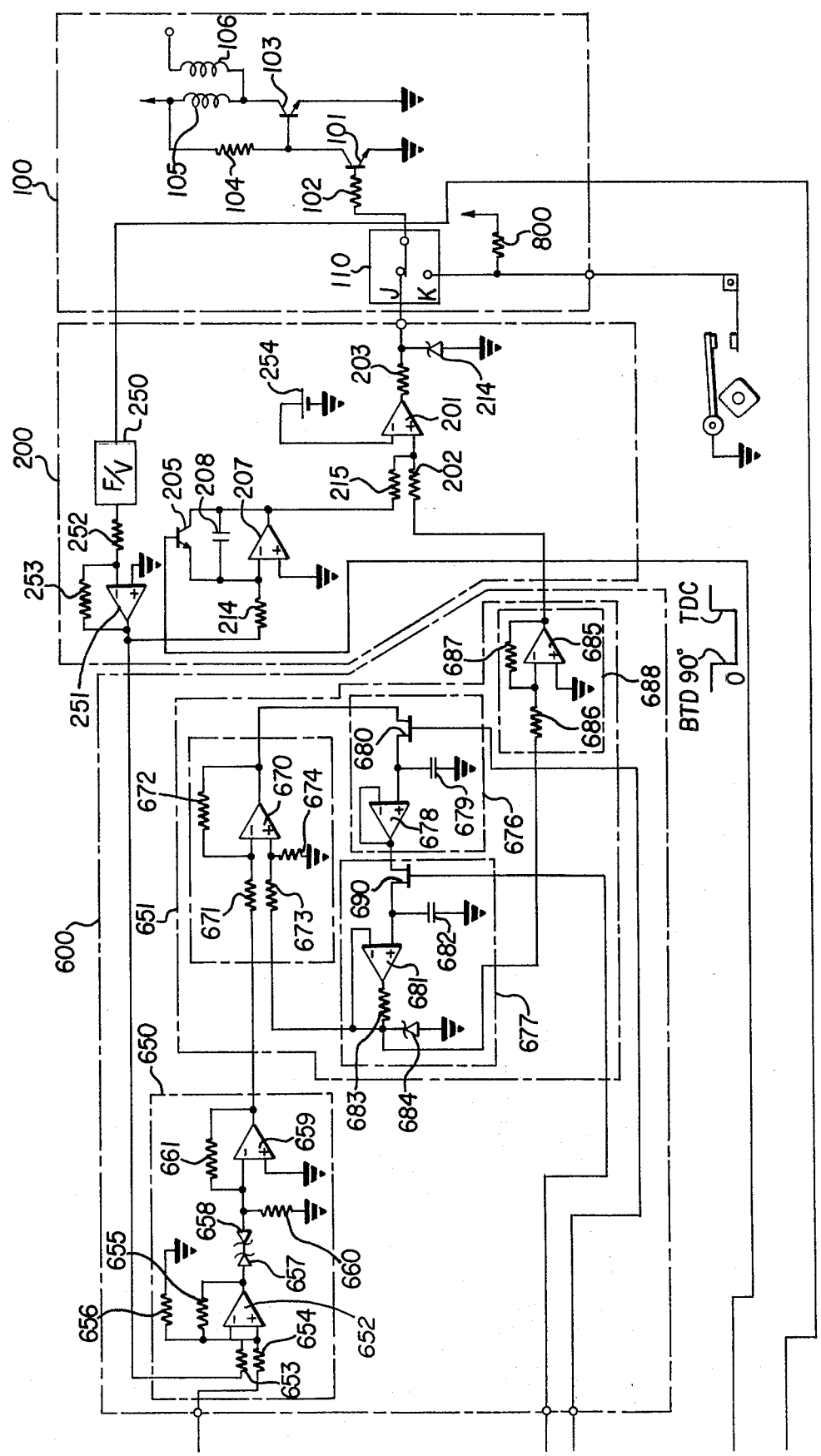

FIG. 5 shows a third preferable embodiment of the knocking control device according to the present invention. The third embodiment is characterized in that the ignition timing is so controlled that, with the device installed on a vehicle engine, the knocking strength is maintained lower than a predetermined low level at which the operator does not feel unpleasant. For this purpose, in the third embodiment, the knocking strength signal is detected in correspondence to the sensory judgement of a person.

One of the specific features of the third embodiment resides in that in order to obtain a knocking control action suitable for an actual vehicle, a detection characteristic suitable for the sensory judgement of a person is taken into account in inspecting a knocking strength, and the control operation which is scarcely affected by a variety of disturbances is carried out in controlling the ignition timing with these detection signals.

The knocking strength detection and conversion in the third embodiment are carried out with the following four characteristics taken into consideration:

The first characteristic is such that a part of unpleasant noise caused by knocking is cancelled by engine noise. More specifically, a signal obtained by subtracting a predetermined reference value defined by the noise of an engine itself from a knocking signal detected is employed as a knocking detection signal. In an ordinary vehicle, the knocking sound is cancelled by the noise of the behicle. Accordingly, even if knocking is caused to some extent, it is often difficult to hear the knocking sound. According to the third embodiment it is possible to perform a detection operation suitable for such actual conditions.

The second characteristic is that the knocking strength is determined collectively by taking into consideration not only individual knocking strengths but also the number of times of knockings in a unitary time. That is, in the case where knockings are equal in strength, if the frequency of knocking generation is low, the sensory judgement determines that the knocking strength is weak; but if it is high, the sensory judgement determines that the knocking strength is strong. Accordingly, in this third embodiment, the product of the knocking strength and the number of times of knocking generation is employed as a knocking strength for control operation.

The third characteristic is that, based on the fact that knocking stimulates, as a logarithmic function, the sensory judgement of a person, a detected knocking signal is converted into logarithmic data for control operation.

The fourth characteristic resides in that, in the case where noise is increased with the speed of an engine, similarly as in the first characteristic the knocking detecting sensitivity by the sensory judgement of a person is reduced by the noise of the engine itself, as a result of which even a strong knocking can be accepted. That is, the fourth characteristic is characterized in that, according to the above-described three characteristics, the converted signal is compared with the reference value which is varied according to the speed of the engine, whereby the knocking allowable value is increased when the engine is run at high speed. According to the experiments, it has been found that the allowable knocking strength is increased in a logarithmic function mode with respect to the increment of the speed of an engine. Therefore, if the reference value is varied according to the logarithmic function, then the knocking control can be effected most suitably at all times.

In this embodiment, according to the above-described four characteristics, an ignition timing control signal can be obtained by subjecting the knocking signal to detection and conversion. In the third embodiment, the ignition timing control signal is used for an intermittent control operation. In general, a knocking phenomenon is such that, as the knocking strength is decreased, the number of times of knocking generation per unitary time is decreased. Therefore, in such a case, instead of a continuous ignition timing control method, an intermittent control method is employed in which the ignition timing is advanced or delayed by a predetermined unitary angle, for instance, one degree every constant period. In this embodiment, the ignition timing control operation is effected with a period of 0.5 second. This intermittent control operation can remarkably improve the control efficiency. In addition, the specific feature of the control operation of the third embodiment resides in that the difference between the detected knocking signal and the reference value is not used as the control signal, as it is; that is, when the difference exceeds a predetermined value, a predetermined angle advance or delay is carried out.

The circuitry of the third embodiment will be described in detail.

The embodiment shown in FIG. 5 is the knocking control device according to the present invention, which is applied to a four-cylinder engine.

A knocking detecting circuit 400 comprises piezoelectric pickups 421, 422, 423 and 424 which are similar to that in the first embodiment. The pickups are connected respectively through resistors 425, 426, 427 and 428 to a load resistor 429. Accordingly, in the knocking detecting circuit 400, a knocking signal for each of the cylinders is applied, in the form of a serial signal, to a knocking strength signal conversion circuit 700 at different time instants.

The knocking strength signal conversion circuit 700 operates to average the detection signals by subjecting to addition and average the maximum detection amplitudes of the outputs of the knocking detecting circuit 400 every predetermined time, in order to obtain the average value of the amounts of variation due to the cylinder internal pressure variations caused by knocking, and to carry out signal conversion corresponding to the above-described first, second and third characteristics based on the sensory characteristic of a person.

The output of the knocking detecting circuit 400 has a polarity that when the pressure increases in the positive direction, it will provide a positive voltage. The output of the circuit 400 is applied to a knocking strength signal conversion circuit 700 as an averaging circuit. Namely, the output of the circuit 400 is applied through a high-pass filter comprising a capacitor 701 and a resistor 702 to a differential amplifier 703. The high-pass filter allows only a frequency component higher than 5 to 6 KHz to pass therethrough. As a result, only the knocking signal is supplied to the differential amplifier 703.

The differential amplifier 703 is a polarity inversion amplifier comprising an operational amplifier 704, resistors 705 and 706, and a voltage source 707. In the differential amplifier 703, the aforementioned knocking detection signal and the negative reference value of the voltage source 707 is subjected to subtraction in a polarity mode. The voltage value of the voltage source 707 is set to a value which corresponds to the ordinary noise level of the engine itself, whereby the above-described first characteristic suitable for the sensory characteristic of a person can be obtained. That is, only when the knocking detection signal becomes greater than the voltage value of the voltage source 707 which is the reference value, the differential amplifier 703 outputs a negative signal.

The output of the differential amplifier 703 is applied through an analog switch 710 to a frequency calculation circuit for obtaining the second characteristic suitable of the sensory characteristic of a person. The analog switch 710 comprises a field-effect transistor (FET), and it is rendered conductive for the period in which the knocking occurs, that is, the period in which the crank angle corresponds to 10 to 30 degrees after the top dead center, and it is rendered non-conductive for the other period, whereby the mixing of noise can be eliminated. The crank angle signal from the crank angle detecting circuit 300 described in the first embodiment is supplied to the gate of the analog switch 710, so that the switch 710 is rendered conductive only in a desired crank angle range.

The crank angle detecting section of the crank angle detecting circuit 300 has the same disk 301 as described in the first embodiment, which has the magnetic substance 304, 305, 306 and 307. Magnetic substances 311 and 312 are provided respectively at positions on the circumference of a concentric circle on the disk, which are 10° and 30° after the above-described magnetic substance 304 at the top dead center in the rotation direction, the diameter of the concentric circle being smaller than that of the disk. In addition, magnetic substances 313 and 314 are provided respectively as the positions which are symmetrical with the positions of the magnetic substances 311 and 312 with respect to the axis. A magnetic pickup 310 made up of a magnet 309 and a winding is disposed in such a manner that it will provide a voltage at 10° ATDC and 30° ATDC as the magnetic substances 311 and 312 pass through the magnetic pickup. The output of the magnetic pickup 310 is connected to an additionally provided flip-flop 315. The flip-flop 315 provides a positive voltage for the period which corresponds to 10° ATDC to 30° ATDC of each cylinder, and a voltage of 0 volts for the other period. The output of the flip-flop 315 is applied to the gate of the aforementioned analog switch 710. The other functions of the crank angle detecting circuit 300 are similar to those in the first embodiment.

The frequency calculation circuit comprises a peak hold circuit 711, and first, second and third hold circuits 712, 713 and 714. The frequency calculation circuit operates to sample the knocking signal maximum amplitude values at a desired time interval, and to output the product of the number of times of knocking generation in a predetermined period of time and the knocking strength at that time, thereby to carry out the signal conversion operation suitable for the second characteristic described above. In the embodiment illustrated in FIG. 5, the desired time interval is set to the oscillation period of an oscillator 715, or 0.5 second.

The peak hold circuit 711 comprises an operational amplifier 716, a diode 717, a capacitor 718 and an analog switch 719. The negative maximum amplitude value among the knocking signals of the differential amplifier 703 is held by the capacitor 718. And the hold value of the capacitor 718 is reset because the capacitor 718 is discharged when the analog switch 719 is rendered conductive. In other words, a control signal which falls (off-operation) at the top dead center and rises (on-operation) at 90 degrees after the top dead center is supplied from the crank angle detecting circuit 300 to the gate of the analog switch 719 through an inverter 720. Accordingly, the capacitor 718 starts the hold operation at the top dead center in crank angle, and the analog switch 719 is rendered conductive at the time instant corresponding to 90 degrees after the top dead center, thereby to reset the hold value of the capacitor 718.

The output of the peak hold circuit 711 is applied to the first hold circuit 712 where cumulative addition is carried out. The first hold circuit 712 comprises operational amplifiers 721, 722 and 723, resistors 724, 725, 726 and 727, a diode 728, a capacitor 729 and an analog switch 730. In the operational amplifier 721, two input signals from the peak hold circuit and the second hold circuit are subjected to addition, and the resultant addition output is held in the capacitor 729 once.

The output of the first hold circuit 712 is applied through the second hold circuit 713 to the operational amplifier 721 in the first hold circuit 712, so that the maximum amplitude values of the knocking signals generated during a desired cumulative period are subjected to cumulative addition. The second hold circuit 713 comprises an operational amplifier 731, a capacitor 732, and analog switches 733 and 734. A trigger pulse obtained through a monostable multivibrator circuit 735 from the output of an inverter 720 is applied to the gate of the analog switch 733 at the time instant corresponding to 90 degrees after the top dead center in crank angle, whereby the analog switch 733 is rendered conductive for a short time. A trigger pulse is supplied from an oscillator 715 through an inverter 740 and a monostable multivibrator 741 to the analog switch 734 for a short time after a desired cumulative period, so that the hold value of the capacitor 732 is reset. The output of the operational amplifier 731 in the second hold circuit 713 is supplied to the non-inverting terminal of the operational amplifier 721 in the first hold circuit 712 and is cumulatively added to the knocking signals applied from the peak hold circuit 711 to the inverting input terminal of the operational amplifier 721.

The output of the first hold circuit 712 thus cumulated is supplied to the third hold circuit every desired time and is held by the capacitor 742 in the hold circuit 714. The third hold circuit 714 includes an operational amplifier 743, and an analog switch 744. The output of the oscillator 715 is applied to the gate of the switch 744, so that the analog switch 744 is rendered conductive every desired time, and the aforementioned cumulative signal is delivered from the first hold circuit 712 to the capacitor 742 in the third hold circuit 714.

The operation of the frequency calculation circuit thus organized will be described. In general, the actual speed of an engine is of the order of 600 to 6000 rpm, and in the case of a four-cylinder engine, ignition is caused 10 to 100 times in 0.5 second which is the set frequency calculation period. Accordingly, 10 to 100 knocking signals at maximum are subjected to cumulative addition. Let us consider the case where the outputs of the oscillator 715 and the monostable multivibrator 741 are at "0". In this case, the analog switches 730, 734 and 744 in the respective hold circuits 712, 713 and 714 are in the off-state. When any one of the cylinders in the engine causes knocking, the peak hold circuit 711 holds the maximum amplitude value of the knocking signal for the period corresponding to the crank angle from the top dead center to 90 degrees after the top dead center, and this hold value is held by the capacitor 729 in the first hold circuit and is provided as an output voltage at the output of the hold circuit 712. When the crank angle reaches 90 degrees after the top dead center, in the peak hold circuit 711 the hold value of the capacitor 718 is reset as the analog switch 719 is rendered conductive, while the analog switch 733 in the second hold circuit 713 is rendered conductive for a short time by the trigger pulse from the monostable multivibrator 735, as a result of which the output of the first hold circuit 712 is held by the capacitor 732. The hold value of the capacitor 732 is applied through the operational amplifier 731 to the first hold circuit 712, and this value is held by the capacitor 712 again. In this case, the output of the peak hold circuit 711 is zero as the capacitor 718 is reset. Accordingly, the capacitor 729 in the first hold circuit 712 holds only the signal supplied by the second hold circuit 713.

If, under this condition, knocking is newly caused and the knocking signal is applied from the peak hold circuit 711 to the inverting input terminal of the operational amplifier 721, then this input signal is added to the above-described output of the second hold circuit 713 in the operational amplifier 721 and is held by the capacitor 729. The above-described addition operation is continuously repeated, as a result of which a voltage value obtained by subjecting the knocking signal maximum amplitude values to addition as many times as the number of times of knocking generation is provided at the output terminal of the first hold circuit 712.

After the lapse of a predetermined time, the pulse which rises (on-operation) in a short time is supplied from the oscillator 715 to the analog switch 744 in the third hold circuit 714, and the cumulative addition output of the first hold circuit 712 at that time is held by the capacitor 742. The pulses outputted by the oscillator 715 is applied through the inverter 740 and the monostable multivibrator 741 to the analog switches 730 and 734 in the first and second hold circuits 712 and 713, as a result of which the capacitors 729 and 732 in the hold circuits 712 and 713 are reset; that is, the cumulation start state is obtained again to be ready for the next frequency calculation operation.

The output obtained as described above is the knocking signal which is obtained by taking into account the noise level of the engine body and the frequency of knocking generation. This output is converted into a signal by a logarithmic converter 750 according to a desired logarithmic function, the signal being outputted, as the knocking strength signal, by the knocking strength signal conversion circuit 700. Accordingly, the above-described third characteristic can be obtained by setting the logarithmic function of the logarithmic converter 750 to a desired value.

The output of the knocking strength signal conversion circuit 700 as an averaging circuit is compared with a knocking allowable reference value in the comparison circuit 600, and an ignition timing control signal is outputted according to the comparison result. The comparison circuit 600 comprises a difference detection circuit 650 for comparing the knocking signal with the reference value, and an ignition timing memory circuit 651 for controlling the ignition timing by sampling the difference from the difference detection circuit 650 every predetermined time concerning the aforementioned conversion circuit 700.

The difference detection circuit 650 comprises a difference amplifier including an operational amplifier 652 and resistors 653, 654, 655 and 656, Zener diodes 657 and 658 which are series-connected, in opposite polarity to each other, to the output of the difference amplifier, and an amplifier including an operational amplifier 659, and resistors 660 and 661. Applied to the non-inverting input terminal of the operational amplifier 652 in the difference amplifier are the output of the signal conversion circuit 700 through the resistor 654, and a reference signal described later through the resistor 653. The reference signal is supplied as a DC voltage proportional to the r.p.m. of the engine, whereby the above-described fourth characteristic corresponding to the sensory characteristic of a person can be obtained. In other words, as the reference signal input to the resistor 653 is increased with the speed of the engine, the allowable knocking strength reference value is increased with the engine speed, whereby the control characteristic similar to the sense of a person can be obtained.

The output of the operational amplifier 652 in the difference amplifier is applied to the operational amplifier 659 because of the provision of the Zener diodes 657 and 658 connected oppositely in polarity only when the output exceeds a predetermined Zener voltage. In other words, when the output voltage of the operational amplifier 652 in the difference amplifier exceeds a positive or negative voltage predetermined by the two Zener diodes 657 and 658, the equivalent (operating) resistance of the two Zener diodes is reduced, and the output of the operational amplifier 652 is applied to the input terminal of the operational amplifier forming an inversion amplifier. In this case, as the operational amplifier 659 operates as an inverting amplifier having a high amplification degree and receiving the equivalent resistance of the two Zener diodes at its input resistance, the output of the operational amplifier 659 is saturated to be a negative or positive constant voltage. In the embodiment illustrated in FIG. 5, when the knocking is increased whereby the difference becomes larger than the predetermined value, the operational amplifier 659, or the difference detection circuit 650 outputs the negative constant voltage corresponding to minus (−) one degree in crank angle, that is the saturation voltage of the operational amplifier 659. If the difference is smaller than the predetermined value, a positive voltage corresponding to plus (+) one degree is outputted therefrom.

In the case where the output voltage of the operational amplifier 652 in the difference amplifier is in a positive or negative voltage range predetermined by the Zener diodes, the equivalent resistance of the two Zener diodes 657 and 658 becomes considerably high, and therefore the input to the operational amplifier 652 is considerably decreased. Furthermore, as the very high equivalent resistance of the aforementioned diodes 657 and 658 becomes the equivalent input resistance of the operational amplifier 659 forming the inverting amplifier, the amplification degree of the operational amplifier 659 is considerably decreased. Accordingly, in this case, the output of the operational amplifier 659 is zeroed.

As is apparent from the above description, according to the third embodiment, the control signal based on the knocking strength corresponding to the above-described four characteristics can be obtained. This control signal is converted into a signal by the ignition timing memory circuit 651, which controls the ignition timing intermittently at predetermined time intervals.

The ignition timing memory circuit 651 comprises a differential amplifier 675 including an operational amplifier 670 and resistors 671, 672, 673 and 674, for subjecting a current ignition timing control signal and the difference signal from the difference detection circuit 650 to addition and subtraction. The ignition timing memory circuit 651 further comprises a fourth hold circuit 676 and a fifth hold circuit 677, for renewing the ignition timing control signal intermittently at the time intervals predetermined by the above-described oscillator 715.

The fourth hold circuit 676 includes an operational amplifier 678, a capacitor 679 and an analog switch 680. Similarly, the fifth hold circuit 677 includes an operational amplifier 681, a capacitor 682, a resistor 683, a Zener diode 684 and an analog switch 690. The output of the fifth hold circuit 677 is applied through an inverting amplifier 688 including an operational amplifier 685 and resistors 686 and 687 to the ignition control circuit 200 from the comparison circuit 600.

The operation of the ignition timing memory circuit 651 will be described in detail:

When the knocking strength exceeds the predetermined value, the difference detection circuit 650 outputs the negative voltage corresponding to −1 degree in crank angle. This output is supplied to the comparator 675 in the ignition timing memory circuit 651, as a result of which, a positive voltage is provided at the output terminal of the operational amplifier 670. If, in this case, the normal positive voltage corresponding to the ignition timing at which ignition is effected at the present time is provided at the output terminal of the operational amplifier 681 in the fifth hold circuit 677, then as this output is applied to the other input terminal of the operational amplifier 670 in the differential amplifier, the two input signals are subjected to subtraction in the comparator 675, and the comparator 675 outputs a positive signal to decrease the crank angle by one degree.

The new ignition timing control signal is held by the capacitor 679 when the oscillator 715 outputs a short positive pulse rendering conductive the analog switch 680 in the fourth hold circuit 676. When the output pulse of the oscillator 715 falls negative, it is applied through the monostable multivibrator 741 to the analog switch 690 in the fifth hold circuit 677, as a result of which the hold value of the capacitor 679 is shifted into the capacitor 682 and this new ignition timing control signal is supplied from the hold circuit 677 to the inverting amplifier 688. Thus, it can be understood that, according to the third embodiment, the ignition timing signal is renewed according to the knocking strength intermittently every 0.5 second defined by the oscillator 715.

The comparison circuit 600 operates to angularly advance or delay the ignition timing signal according to the output of the difference detection circuit 650, and this control signal is provided as the output voltage of the fifth hold circuit 677. If, in this connection, a signal which considerably delays the ignition timing is outputted by the fifth hold circuit 677 because of the occurrence of some abnormal condition, the engine is markedly adversely affected thereby. In order to eliminate this difficulty, a protective circuit comprising a resistor 683 and a Zener diode 684 is provided in the output side of the operational amplifier 681, thus preventing the provision of a control signal whose amplitude is higher than the Zener voltage.

The output of the operational amplifier 681 described above is a positive voltage at all times. However, when the knocking becomes great, that is, it is necessary to delay the ignition timing, the positive voltage is increased; while when the knocking becomes small or zero, that is, it is necessary to advance the ignition timing, the positive voltage is reduced toward zero. Accordingly, as for the output of the inversion amplifier comprising the operational amplifier 685, i.e., the output of the comparison circuit 600, the negative voltage is increased when it is necessary to delay the ignition timing, and in contrast the negative voltage is decreased toward zero when it is necessary to advance the ignition timing.

The ignition timing control signal provided by the comparison circuit 600 is compared with the crank angle in the ignition control circuit 200 and is then applied to the ignition circuit 100 in the same manner as the first embodiment. In the third embodiment, the circuit 200 is similar to that in the first embodiment except that the engine r.p.m. signal for obtaining the crank angle signal is obtained from a frequency to voltage conversion circuit and a protective circuit is provided.

That is, a frequency to voltage conversion circuit 250 for converting an ignition signal frequency into a DC voltage, and an amplifier comprising an operational amplifier 251 and resistors 252 and 253 for amplifying the output of the conversion circuit 250, are connected to the input of an operational amplifier 207 for providing a ramp voltage. Thus, the ignition signal frequency is converted into a DC voltage, and this DC voltage, after being inverted in polarity, is applied to an integrator including the operational amplifier 207 and a capacitor 208. The inversion voltage proportional to the ignition signal frequency, i.e., the engine r.p.m. is supplied to the difference detection circuit 650 in the comparison circuit 600, thus providing the reference voltage corresponding to the engine r.p.m. for obtaining the fourth characteristic.

When the ignition timing control signal applied through a resistor 202 to an operational amplifier 201 adapted to compare the ignition timing control signal with the crank angle is reduced to approximately zero because of an abnormal condition such as a disturbance, the output of the operational amplifier 201 becomes a significant angle advancing signal, which will considerably adversely affect the ignition operation. In order to prevent the occurrence of such abnormal condition, a voltage source 254 is connected to the other input terminal of the operational amplifier 201, thus controlling the maximum angle advancing value. Accordingly, in the third embodiment the angle advancement is no more than about 40–50 degrees at worst.

The ignition control signal thus obtained is applied through a change-over switch 110 to the ignition circuit 100 described with reference to the first embodiment. By the switching operation of the change-over switch 110, it is determined whether the ignition control signal supplied to the ignition circuit 100 should be controlled by the above-described knocking control voltage or should be obtained from the conventional contact point. In the case where the contact point is utilized, a resistor 800 for bias current is connected to the contact point.

As is apparent from the above description, in the third embodiment, the knocking strength is maintained at the constant level which is very low. Therefore, the third embodiment can be applied to various engine tests which are carried out by changing the load and speed of an engine, which makes it possible to provide design data on anti-knock engines and information on octane numbers.

Furthermore, in the third embodiment, the knocking strength is maintained at the constant level which is very low, as was described above. Therefore, the third embodiment can be applied to an engine test according to a corrective border line method which is a general method of evaluating the anti-knocking characteristic of a vehicle or fuel, which makes it possible to provide reliable information on vehicle running octane numbers and fuel octane numbers, thus providing useful data in engine design.

As is clear from the above description, according to the present invention, the engine knocking strength is detected as an amount of variation corresponding to the cylinder internal pressure, and the knocking signal corresponding to the knocking energy can be obtained by averaging the detected signal. Thus, the knocking control operation excellent in efficiency can be provided.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A knocking control device for an ignition circuit of an engine comprising:
    a knocking detecting circuit for detecting, as an electrical signal, an amount of variation corresponding to an internal pressure variation within a cylinder of said engine due to a knocking of said engine,
    an averaging circuit for converting said electrical signal from said knocking detecting circuit to a signal corresponding to a knocking energy,
    a crank angle detecting circuit for detecting a rotation phase of said engine,
    a comparison circuit for comparing said signal corresponding to said knocking energy from said averaging circuit with a reference value defining a predetermined knocking level to obtain a control signal for maintaining an engine knocking level in a predetermined range, and
    an ignition control circuit adapted to be connected to the ignition circuit, for controlling the ignition timing of the ignition circuit by said control signal from said comparison circuit.

2. The knocking control device according to claim 1, wherein:
    said averaging circuit time-averages said electrical signal from said knocking detecting circuit and obtains said signal corresponding to said knocking energy.

3. The knocking control device according to claim 1, wherein:
    said averaging circuit time-averages an envelope signal of said electrical signal from said knocking detecting circuit, and obtains said signal corresponding to said knocking energy.

4. The knocking control device according to claim 1, wherein:
    said averaging circuit adds and accumulates the amplitude value, the maximum amplitude or time average value of an envelope of said electrical signal from said knocking detecting circuit at a predetermined time interval, and obtains said signal corresponding to said knocking energy.

5. The knocking control device according to claim 1, wherein:
    said averaging circuit multiplies an amplitude and numbers of times of generation of said electrical signal from said knocking detecting circuit due to said engine knocking occuring at a predetermined time interval and obtains said signal corresponding to said knocking energy.

6. The knocking control device according to claim 1, wherein:
    said averaging circuit converts, an electrical signal obtained by subtracting a noise reference signal in response to a noise level of said engine from said electrical signal of said knocking detecting circuit, to said signal corresponding to said knocking energy.

7. The knocking control device according to claim 6, wherein:
    said noise reference signal in response to noise level of said engine is logarithmic functionally varied in response to the revolution number of said engine.

8. The knocking control device according to claim 1, wherein:
    said averaging circuit further logarithmically converts said signal corresponding to said knocking energy.

9. The knocking control device according to claim 1, wherein:
    said reference value in said comparison circuit varies in proportion to the number of revolutions of said engine.

10. The knocking control device according to claim 7, wherein:
    said reference value in said comparison circuit is defined by said knocking allowable level logarithmically converted.

11. The knocking control device according to claim 1, wherein:
    said ignition control circuit controls an ignition timing by changing a predetermined constant angle in each predetermined time period.

12. The knocking control device according to claim 5, wherein:
said averaging circuit converts an electrical signal, obtained by subtracting a noise reference signal in response to a noise level of said engine from said electrical signal of said knocking detecting circuit, to said signal corresponding to said knocking energy.

13. The knocking control device according to claim 12, wherein:
said averaging circuit further logarithmically converts said signal corresponding to said knocking energy.

14. The knocking control device according to claim 13, wherein:
said noise reference signal in response to a noise level of said engine is logarithmic functionally varied in response to the number of revolutions of said engine.

15. The knocking control device according to claim 14, wherein:
said reference value in said comparison circuit is defined by said knocking allowable level logarithmically conveted.

16. The knocking control device according to claim 15, wherein:
said ignition control circuit controls an ignition timing by changing a predetermined constant angle in each predetermined time period.

17. The knocking control device according to claim 3, wherein:
said knocking detecting circuit comprises a piezoelectric pickup interposed between an ignition plug and an engine head of said engine.

18. The knocking control device according to claim 17, wherein said averaging circuit includes:
a highpass filter,
a half-wave rectifier having a predetermined time constant for producing an envelope signal of said engine knocking, and
an integration amplifier comprising an operational amplifier having a capacitor connected to a minus input terminal and an output terminal of said operational amplifier for time-averaging said envelope signal.

19. The knocking control device according to claim 18, wherein said comparison circuit comprises:
a resistor connected to said half-wave rectifier and a minus input terminal of said integration amplifier of said averaging circuit,
a reference knocking voltage source,
a variable resistor connected to said reference knocking voltage source, and
a resistor connected to a control terminal of said variable resistor and said minus input terminal of said integration amplifier of said averaging circuit, thereby comparing said envelope signal of said engine knocking with said reference knocking voltage.

20. The knocking control device according to claim 19, wherein said crank angle detecting circuit includes:
a detection disk simultaneously rotated with the rotation of a crank shaft of said engine,
four magnetic substances respectively provided at positions of the top dead center, 90 degrees before the top dead center, 90 degrees after the top dead center, and the bottom dead center on said detection disk,
a magnetic coil provided opposed to said magnetic substances of said detection disk, and
a flip-flop connected to said magnetic coil.

21. The knocking control device according to claim 20, wherein said ignition control circuit includes:
a comparator including an operational amplifier having a plus input terminal connected to said integration amplifier of said averaging circuit through a resistor, a minus input terminal connected to ground and an output terminal connected to a resistor and a Zener diode,
a monostable multivibrator connected to said Zener diode,
a smoothing circuit connected to said monostable multibrator,
an integrating circuit including an operational amplifier having a capacitor connected to a minus input terminal of said operational amplifier, an output terminal thereof, and said plus input terminal of said comparator through a resistor, and
a transistor having a base terminal connected to said flip-flop of said crank angle detecting circuit, an emitter terminal connected to said minus input terminal of said integrating circuit and a collector terminal connected to said output terminal thereof.

22. The knocking control device according to claim 3, wherein:
said knocking detecting circuit comprises a piezoelectric pickup equipped to a cylinder block of said engine.

23. The knocking control device according to claim 22, wherein said averaging circuit includes:
a first resistor connected to said piezo-electric acceleration pickup for forming a high pass filter with said piezo-electric acceleration pickup,
a half-wave rectification amplifier including an operational amplifier having a second resistor and a diode respectively connected to a minus input terminal of said operational amplifier and an output terminal of said operational amplifier in parallel for producing an envelope knocking signal,
a smoothing circuit including a third resistor connected to said half-wave rectification amplifier and a first capacitor connected to said third resistor and ground for producing a time-average signal of said envelope knocking signal, and
an operational amplifier having a plus input terminal connected to said smoothing circuit.

24. The knocking control device according to claim 23, wherein:
said crank angle detecting circuit comprises a contact breaker of an ignition device of said engine.

25. The knocking control device according to claim 24, wherein said comparison circuit includes:
an operational amplifier having a minus input terminal connected to said averaging circuit through a fourth resistor, a capacitor connected to said minus input terminal and an output terminal,
a reference knocking voltage source connected to said minus input terminal of said operational amplifier through a variable fifth resistor and a sixth resistor,
a monostable multivibrator, and
an integration circuit connected to said monostable multivibrator through a seventh resistor and to said minus input terminal of said operational amplifier through an eighth resistor.

26. The knocking control device according to claim 25, wherein said ignition control circuit includes:
- a ramp voltage generating circuit comprising a plus voltage source, a series combination of a ninth resistor and a second capacitor connected to said crank angle detecting circuit, and
- a comparator comprising an operational amplifier having a plus input terminal thereof connected to said operational amplifier of said comparison circuit and said ramp voltage generating circuit through respective tenth and eleventh resistors, a minus input terminal thereof connected to ground, and an output terminal connected to a twelth resistor, the twelfth resistor being connected to a Zener diode and said monostable multivibrator of said comparison circuit.

27. The knocking control device according to claim 16, wherein said knocking device circuit includes:
- four piezo-electric pickups, each of the four piezo-electric pickups interposed between a respective ignition plug and an engine head of said engine, and four resistors respectively connected to said four piezo-electric pickups and a load resistor connected to ground.

28. The knocking control device according to claim 27, wherein said crank angle detecting circuit includes:
- a detection disk simultaneously rotated with the rotation of a crank shaft of said engine,
- four first magnetic substances respectively provided at positions of the top dead center, 90 degrees before the top dead center, 90 degrees after the top dead center, and the bottom dead center on an outer part of said detection disk,
- four second magnetic substances respectively provided at positions of 10 degrees and 30 degrees after the top dead center, 10 degrees and 30 degrees after the bottom dead center on an inner part of said detection disk,
- a first magnetic coil provided opposed to said four first magnetic substances on said outer part of said detection disk,
- a second magnetic coil provided opposed to said four second magnetic substances on said inner part of said detection disk,
- a first flip-flop connected to said first magnetic coil, and
- a second flip-flop connected to said second magnetic coil.

29. The knocking control device according to claim 28, wherein said averaging circuit includes:
- a high pass filter comprising a capacitor connected to said knocking detecting circuit, and a resistor connected to said capacitor,
- a differential amplifier comprising an operational amplifier, two resistors and a voltage source for forming a polarity inversion amplifier,
- an analog switch comprising a field-effect transistor connected to said differential amplifier and to said second flip flop of said crank angle detecting circuit,
- a first inverter connected to said second magetic coil of said crank angle detecting circuit,
- a first monostable multivibrator connected to said first inverter,
- an oscillator for generating a clock pulse of 0.5 sec.,
- a second inverter connected to said oscillator,
- a second monostable multivibrator connected to said second inverter,
- a frequency calculation circuit connected to said analog switch and comprising a peak hold circuit, said peak hold circuit including an operational amplifier, a diode, a capacitor and an analog switch connected to said first inverter, a first hold circuit connected to said peak hold circuit and comprising three operational amplifiers, four resistors, a diode, a capacitor and an analog switch connected to said second monostable multivibrator, a second hold circuit, connected to said first hold circuit, comprising an operational amplifier, a capacitor, two analog switches respectively connected to said first and second monostable multivibrators, a third hold circuit comprising an operational amplifier, an analog switch connected to said first and second hold circuits and said oscillator, and a capacitor, and a logarithmic converter connected to said third hold circuit.

30. The knocking control device according to claim 29, wherein said comparison circuit includes:
- a difference detection circuit connected to said averaging circuit and comprising a difference amplifier, said difference amplifier including an operational amplifier and four resistors, two opposed Zener diodes connected in series, and two resistors, and
- an ignition timing memory circuit comprising a comparator, said comparator including an operational amplifier and four resistors, a fourth hold circuit including an operational amplifier, a capacitor and an analog switch connected to said comparator and said oscillator of said averaging circuit, a fifth hold circuit including an operational amplifier connected to said comparator, a resistor, a Zener diode, a capacitor and an analog switch connected to said operational amplifier of said fourth hold circuit and to said second monostable multivibrator of said averaging circuit, and an inverting amplifier including an operational amplifier, and a first resistor and a second resistor connected to said Zener diode of said fifth hold circuit.

31. The knocking control device according to claim 30, wherein said ignition control circuit includes:
- an amplifier including an operational amplifier connected to said difference amplifier of said difference detection circuit of said comparison circuit and two resistors,
- a frequency voltage converter connected to said first and second flip-flops of said crank angle detecting circuit and said amplifier,
- an integrator including an operational amplifier, a capacitor, a transistor switch connected to said second flip-flop of said crank angle detecting circuit and a resistor, and
- a comparator including an operational amplifier, a resistor connected to said inverting amplifier of said comparison circuit, a resistor connected to said integrator, a voltage source connected to a minus input terminal of said operational amplifier of said comparator, a resistor connected to an output terminal of said operational amplifier of said comparator, and a Zener diode connected to a change-over switch of an ignition circuit and to said resistor connected to the output terminal of said operational amplifier of said comparator.

32. A knocking control device for an ignition circuit of an engine comprising:
- a knocking detecting circuit for detecting, as an electrical signal, an amount of variation corresponding to an internal pressure variation within a cylinder of said engine due to a knocking of said engine;

an averaging circuit for signal-processing said electrical signal from said knocking detecting circuit in response to at least an amplitude of an engine knocking signal and converting said electrical signal to a signal corresponding to a knocking energy;

a crank angle detecting circuit for detecting a rotation phase of said engine;

a comparison circuit for comparing said signal corresponding to said knocking energy from said averaging circuit with a reference value defining a predetermine knocking level to obtain a control signal for maintaining an engine knocking level in a predetermined range; and an ignition control circuit adapted to be connected to the ignition circuit, for controlling the ignition timing from the ignition circuit by said control signal from said comparison circuit.

* * * * *